United States Patent [19]

Gunning et al.

[11] Patent Number: 5,123,098
[45] Date of Patent: Jun. 16, 1992

[54] METHOD FOR EXECUTING PROGRAMS WITHIN EXPANDED MEMORY OF A COMPUTER SYSTEM USING MS OR PC DOS

[75] Inventors: Michael W. Gunning; James R. Conrad, both of Fort Collins, Colo.

[73] Assignee: Hewlett-Packard Company, Palo Alto, Calif.

[21] Appl. No.: 316,725

[22] Filed: Feb. 28, 1989

[51] Int. Cl.⁵ .................................... G06F 12/08
[52] U.S. Cl. ......................... 395/400; 364/DIG. 1; 364/970; 364/970.5; 364/245; 395/700; 564/245.31
[58] Field of Search .............................. 364/200, 900

[56] References Cited
U.S. PATENT DOCUMENTS

| | | | |
|---|---|---|---|
| 3,970,999 | 7/1976 | Edward | 364/200 |
| 4,403,283 | 9/1983 | Myntti et al. | 364/200 |
| 4,731,738 | 3/1988 | Fisher et al. | 364/200 |
| 4,744,025 | 5/1988 | Lipcon et al. | 364/200 |
| 4,761,736 | 8/1988 | Di Orio | 364/200 |
| 4,831,522 | 5/1989 | Henderson et al. | 364/200 |
| 4,891,752 | 1/1990 | Fairman et al. | 364/200 |
| 4,926,322 | 5/1990 | Stimac et al. | 364/200 |
| 4,943,910 | 7/1990 | Nakamura | 364/200 |

OTHER PUBLICATIONS

"Expanded Memory: Writing Programs that Break the 640K Barrier", Hansen et al., Mar. 1987, pp. 21-32.
"Understanding Expanding Memory Systems", in *The Waite Group's MS-DOS Papers for MS DOS Developers and Power Users*, Howard W. Sams Company, 1988, p. 538.

Primary Examiner—Joseph A. Popek
Assistant Examiner—Reba I. Elmore

[57] ABSTRACT

A method of executing a program module in an expanded memory of a computer system using PC or MS DOS. The program module is divided into a resident section and a transient section. After loading the module into main memory, the program module relocates the transient section to expanded memory. The module is called, either directly or via an interrupt, through an entry point in the resident section, while the majority of the program module function is performed by the code in the transient section. The module is also divided into a third, data, section which can be shared by the resident and transient sections, and which can be loaded either into expanded or main memory.

4 Claims, 13 Drawing Sheets

FIG. 1

PRIOR ART

METHOD FOR EXECUTING PROGRAMS WITHIN EXPANDED MEMORY OF A COMPUTER SYSTEM USING MS OR PC DOS

BACKGROUND OF THE INVENTION

This invention relates to computer software and more particularly to loading and executing program modules in the memory of a computer. Even more particularly, this invention relates to loading and executing program modules into a computer having a main memory and an expanded memory with bank switchable pages.

When the IBM personal computer was introduced in 1981, the addressable memory limit imposed by the hardware, and DOS operating system introduced along with it, was 640K bytes, where K is 1024. While this limitation was not significant at first, there was soon a need for more than the 640K memory that was available as main memory. As a consequence of this need several vendors developed a form of memory called expanded memory, and more commonly known as bank switched memory, with a size considerably in excess of the 640K available as main memory. This expanded memory is addressed not as main memory, but as a special page frame of 64K located at an address above the 640K limit. Although the expanded memory may be very large, only part of the expanded memory, the part switched into the page frame, may be directly addressed by the computer. The expanded memory is divided into pages of 16K, and I/O ports are used to select which 16K page of the expanded memory is accessible in each of the four 16K areas of the page frame. Subsequent versions of this expanded memory allowed the page frame to exceed 64K and allowed the page frame to be located at any address not containing main memory or I/O memory.

As the amount of software available for this computer has increased, the 640K limitation for programs has become more of a burden. Not only are user programs getting larger, a new type of software, called terminate and stay resident (TSR) software because it stays in memory after being loaded by a user, is now available to perform functions for a user while other software is running. The TSR software monitors keyboard input, and when a certain combination of keys is pressed, it takes over the machine from the user's currently running software to perform a request of the user. Since TSRs stay memory resident, they occupy part of the 640K total main memory available. Another type of code that stays memory resident is a DOS device driver. There is a device driver for each type of I/O device since the device drivers are the software that link the user code to the I/O device. Device drivers must stay memory resident because a user is allowed to use an I/O device at any time. Although there is a need in the art for using the expanded memory for executable code such as TSRs and device drivers, it has been widely thought that because the page frame was above the 640K limitation of DOS, the expanded memory could only be used for data and not for executable code. This idea has been published in an article by Ray Duncan entitled "Understanding Expanded Memory Subsystems", in *The Waite Group's MS-DOS Papers for MS-DOS Developers and Power Users*, Howard W. Sams Company, 1988, p. 538.

Another paper, "Expanded memory: Writing Programs That Break the 640K Barrier", in the *Microsoft Systems Journal*, Microsoft Corporation, March 1987, pp 21-32, has described a way of using expanded memory for executable code. The method described in this paper separates the code into a "kernel" and a "pseudo-overlay" —the kernel remains in main memory, while the pseudo-overlay is loaded into expanded memory. This method has several deficiencies. First, it fails if expanded memory is not available, so every program that uses it would have to be supplied in two versions, one for a machine that has expanded memory and a different version for a machine that does not have expanded memory. Secondly, this method requires that the kernel and pseudo-overlay be separate programs which are separately loadable by DOS. Thirdly, data cannot easily be shared by the kernel and pseudo-overlay since they are separate programs. A fourth deficiency is that this method does not remove its initialization code after performing initialization, so the code continues to occupy valuable memory all the time the TSR is loaded. Another deficiency with this method is that it cannot be used to write DOS device drivers because DOS device drivers are loaded at the same time DOS is loaded and the order of loading is such that the DOS device drivers are loaded before the DOS overlay function this method needs to load its pseudo-overlay. This method also requires that the code necessary to switch the context of the expanded memory, to bring the TSR pseudo-verlay software into the expanded memory page frame, be resident in each kernel, since no provision is made in the method for a kernel to call a common routine. Lastly, the method is deficient in that a user request to the TSR that has the user request data located in expanded memory will fail, since the TSR will switch the TSR pseudo-overlay pages into the page frame in place of the user pages containing the data, thus making the user data unavailable.

It is thus apparent that there is a need in the art for an improved method of accessing expanded memory that will allow executable code to be placed in expanded memory and further allow such code to be executed directly from such expanded memory. There is a need for such a method that recognizes whether or not expanded memory is available and loads and executes itself in main memory if no expanded memory is available. There is also a need for a method that allows a program module to be a single program so that the main memory resident portion and the expanded memory resident portion can share a data area. The method should also allow the shared data area to be located in either main memory or expanded memory. There is a further need for such a method that releases memory occupied by its initialization code after such code is performed. A further need in the art is for such a method that can be used for program modules written as DOS device drivers. Yet another need is for a method that will share the code necessary to switch the expanded memory page frame context between several program modules. There is also a need for a such a method that allows data from a user request to reside in expanded memory, so that a user is not required to write different code depending upon where the TSR or device driver program modules are located.

SUMMARY OF THE INVENTION

It is an object of the present invention to provide a method of dividing a single programming module into a resident section that must stay in main memory, and data and transient sections that may be loaded into expanded memory.

It is a further object of the present invention to provide a method whereby the program module, without using the DOS loader, relocates its transient and data sections into expanded memory and then modifies its resident section references to the transient and data sections to reflect the addresses of those sections in the page frame.

Another object is to provide a single program module, callable by all other program modules using expanded memory, that performs the context switching required to use the expanded memory page frame.

Yet another object of this invention is to provide a method of determining whether expanded memory is present on the computer system being used and organizing the common context switching program module, as well as the resident section of each other program module, to make the location of the transient and data sections transparent to the code in each resident section.

Still another object of the present invention is to provide a method whereby the program modules may be loaded as DOS device drivers.

Another object is to provide a program module that releases memory occupied by its initialization code after executing such code in order to make as much memory as possible available to the user.

A further object is to provide a method for processing requests where the data involved in the request is located in expanded memory.

The above and other objects of the present invention are accomplished by a method of dividing a program module into a resident section and transient section. The module is also divided into a third, data, section which can be shared by the resident and transient sections, and which can be loaded either into expanded or main memory. A special relocator, part of the module's initialization code, relocates the transient and data sections into expanded memory. After moving these sections into expanded memory, all references from the resident code to the transient and data sections are adjusted to where those sections will be located in the page frame. The resident, data and transient sections of the module are identified as segments to the language processors of the DOS operating system, which allows the relocator to easily identify which sections are to be loaded in each area. Dividing the code into segments also causes the language processors to provide information that identifies address references between segments, which allows the relocator to adjust transient segment address references in other segments after the transient segments are relocated to expanded memory.

The method further provides a separate programming module, which remains resident in main memory, that detects whether or not expanded memory is present. This module also provides services to the resident segment of several modules to save and restore the context of the page frame. Because of these services, the relocator loads the transient and data segments into expanded memory if it is available, or into main memory if the expanded memory is not available, and the resident segment executes in the same manner regardless of where the transient and data segments are located. Also, since these services are available to several modules, additional main memory is saved.

The relocator also relocates the initialization code, a fourth segment of the module that includes the relocator itself, into high main memory so that it can easily be removed from memory after it is executed.

Because the relocator code moves the appropriate sections into expanded memory, no DOS loader services are required for this function. This allows the modules to be written as DOS device drivers which must be loaded at a time when the DOS loader function, which could perform the relocation, is not available.

The method also provides a module that is loaded and connected into the DOS I/O chain to intercept all I/O requests where the data area for the request is located in expanded memory. This module redirects the data to a cache buffer within the module, and later moves the data to expanded memory, so that expanded memory is not used for the request. If the request is for more data than the cache will hold, the module breaks the request into several requests, each having a buffer size requirement less than or equal to the cache size.

BRIEF DESCRIPTION OF THE DRAWINGS

The above and other objects, features, and advantages of the invention will be better understood by reading the following description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined with reference to the appended claims.

In general, the invention relates to placing executable program instructions in an expanded memory of an IBM compatible personal computer. Because of the main memory limitation of 640K imposed by the DOS operating system of this computer, which is sold under the trademark MS-DOS by Microsoft Corporation and under the trademark PC-DOS by IBM Corporation, it is desirable to place executable code into the expanded memory. Expanded memory is designed such that pages are switched in and out of a page frame and only data currently in the page frame is accessible directly by software running in the computer. Because of this design it has been widely thought that code could not be executed from expanded memory.

This invention provides a way of executing code from the page frame of expanded memory. The code is identified to the language processors of DOS as segments, and a segment of code is identified as resident code, which will reside in main memory below the 640K limit, and a segment is identified as transient code, which may reside either in expanded memory or in main memory. A third, data, segment is also identified which may reside in either expanded or main memory. A fourth segment is identified as initialization code, which may be discarded after being executed, whereas the other three segments will remain in memory to service requests.

A special relocator transfers the transient and data segments to expanded memory, if expanded memory is present on the system. The initialization code is then run, and the resident segment remains in main memory to receive all requests. When a request is received, the resident segment saves the current user's page frame context, that is, all information necessary to restore the page frame to its state before the request was received. Then the transient segment pages are switched into the page frame and the resident segment calls the transient segment to process the request. After the request has been processed, the transient segment returns to the resident segment which restores the page frame context and returns to the user.

A separate module called the Network Expanded Memory Manager, or NEMM, is called by the loader to detect whether expanded memory is present. NEMM is also called to save and restore the page frame context. Because all knowledge of expanded memory resides in NEMM and the relocator, when expanded memory is not present on the system, the loader leaves the transient segment in main memory. When a request is received by the resident segment, it calls NEMM to save the page frame context, however NEMM saves the context only if expanded memory is present. The resident segment then calls the transient segment which processes the request and returns to the resident segment. The resident segment then calls NEMM to restore the page frame context, which NEMM does only if expanded memory is present. In this manner, the resident segment and the transient segment work the same whether expanded memory is present or not. If expanded memory is not present, the NEMM save and restore context routines are simply dummy routines. Because the NEMM is a separate module, many other program modules can use its save and restore functions to access expanded memory.

Figure 1:
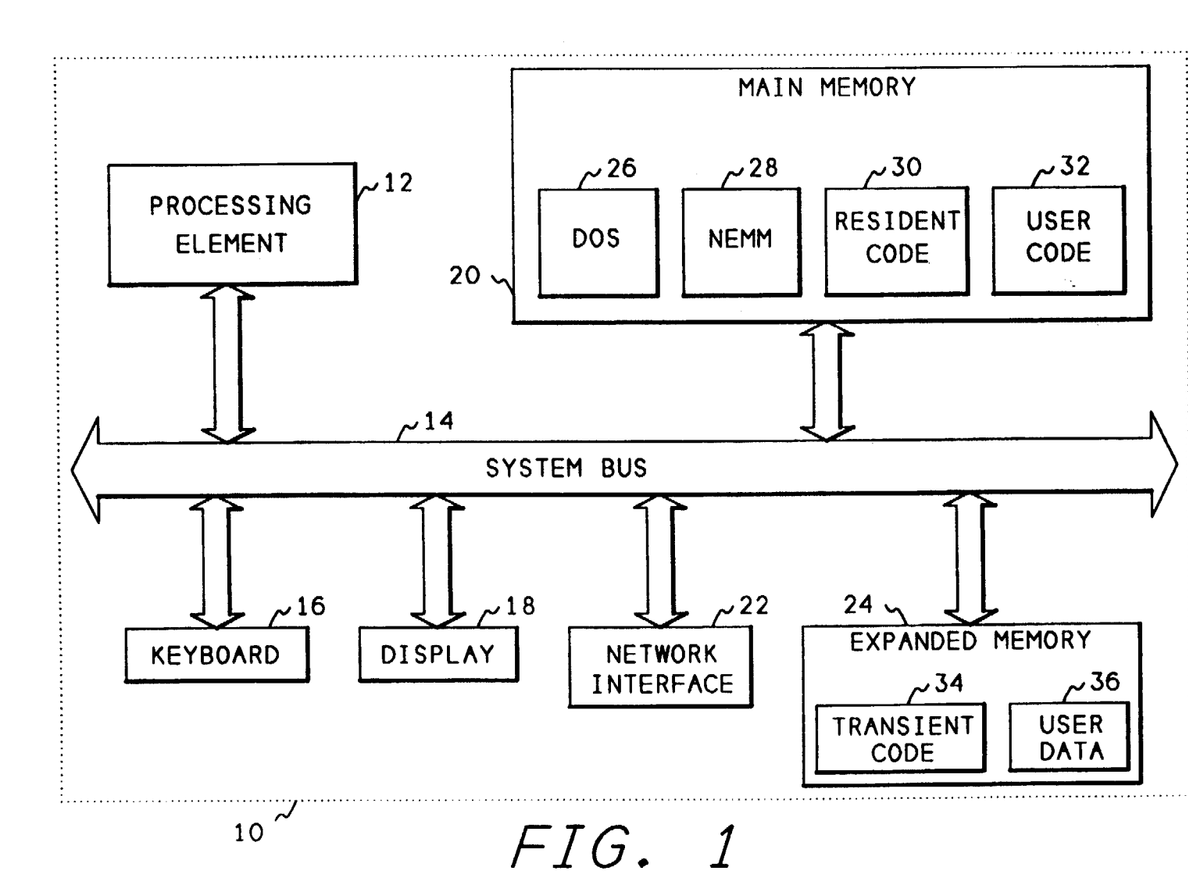
FIG. 1 is a block diagram of a computer having expanded memory and showing where the sections of the program modules of the present invention are located in the computer.

Referring now to FIG. 1, a block diagram of a computer 10, that incorporates the present invention, is shown. A processing element 12 receives instructions from a main memory 20 over a system bus 14. The main memory 20 contains the DOS operating system 26, the Network Expanded Memory Manager (NEMM) 28 of the present invention, the resident code 30 of the present invention, and user code 32. A keyboard 16 and a display 18 are attached to the system bus 14 for communication with the user. A network interface 22 is also attached to the system bus 14 for communication with other computers. The expanded memory 24 attaches to the system bus 14 and it contains the transient code 24 of the present invention as well as user data 36.

Figure 2:
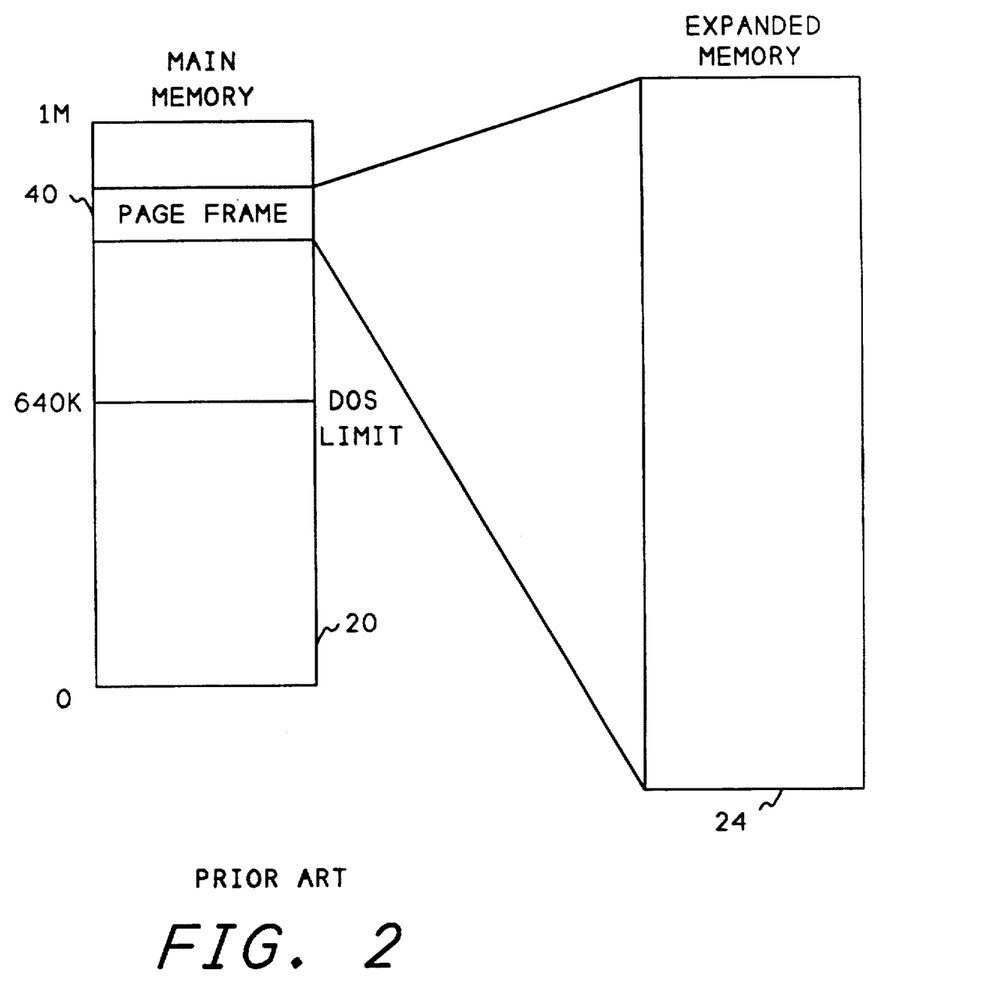
FIG. 2 is an overview of how expanded memory functions.

FIG. 2 shows a logical diagram of the prior art main memory 20 and the expanded memory 24. The main memory 20 has an address limitation of one megabyte imposed by the processing element 12 (FIG. 1), however, the DOS operating system and the organization of the system bus 14 (FIG. 1) place a 640K limitation on operating system and user programs residing in main memory. The memory addresses above the 640K limit are used to address I/O devices, such as the keyboard 16 (FIG. 1), and the display 18 (FIG. 1).

The expanded memory 24 attaches to the system bus 14 (FIG. 1), and contains additional memory that can be used by the computer. This memory may be significantly larger than the 640K main memory, however, only a small portion of the expanded memory is accessible at a given time. The expanded memory is divided into pages of 16K bytes, and a page frame 40 is allocated in the address space above 640K. The page frame is 64K bytes long and will hold 4 pages of expanded memory. Although some versions of expanded memory allow the page frame to be placed at any location of the processing element 12 address space, it is typically placed in the area above 640K. Also, some versions of expanded memory allow the page frame to be larger than 64K. In addition to the page frame, expanded memory also has I/O addresses allocated to it, which are used to select which pages of expanded memory are accessible at the page frame addresses. That is, a page number is stored in an I/O address which causes one of the pages of expanded memory to respond to the addresses of one of the four pages in the page frame. In this manner, software can access any set of four pages within the expanded memory through the four pages in the page frame, and the software can change this selection at any time.

Since the pages in the page frame can be switched at any time, and since it would be difficult for a program to switch pages while it was running in expanded memory, it has been thought that expanded memory could only be used to store data. Service software which is called by a user program can save the page numbers of the pages currently in the page frame (the context), switch in a new set of pages, and use those new pages as long as the service software is in control. Before returning control to the user program, the service software must restore the original page numbers to the page frame so that the user program is not affected by the switch. Since the user program is not affected by the switch, executable code may reside in the expanded memory so long as any other software called by the service software obeys the same rules of saving and restoring context.

Figure 3:
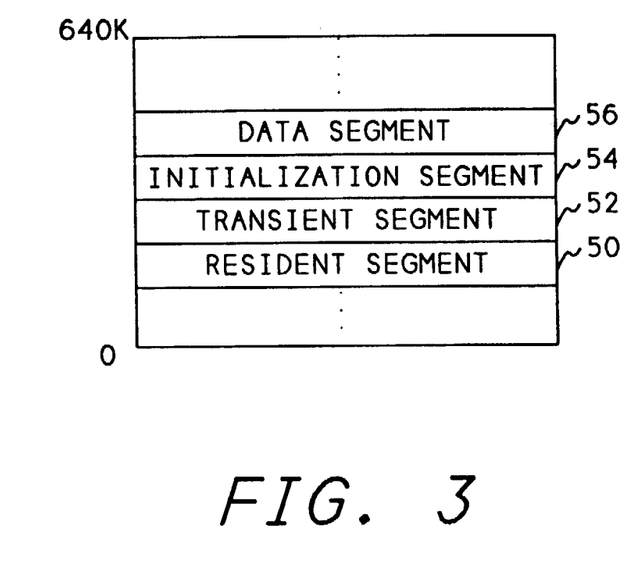
FIG. 3 shows the organization of the sections of code of the present invention as they are loaded into main memory before being relocated.

FIG. 3 shows the organization of a program module of the present invention, as it is loaded into memory by the DOS operating system loader. The program module was defined to the language processors of DOS as four segments. The resident code segment 50 will remain in main memory to receive requests from the user software and to process hardware interrupts from the hardware devices it services. The transient code segment 52 will ordinarily be moved to expanded memory, although the user may request that it remain in main memory. The data segment 56 may reside in either main or expanded memory, depending upon user request. The initialization code segment 54 is code that is only executed once to set up conditions for the program module, and it is ordinarily relocated to high main memory, where it can easily be removed after it is executed, to free as much memory as possible.

One of the program modules of the present invention, the NEMM, processes requests by other program modules to save and restore the page frame context, and to load code or data into the expanded memory. The organization of the NEMM is similar to FIG. 3, differing only in that it does not have a transient segment 52. The NEMM is loaded first, and is then available to the other program modules as they are loaded, and as they execute, to perform services for the user code.

Figure 4A:
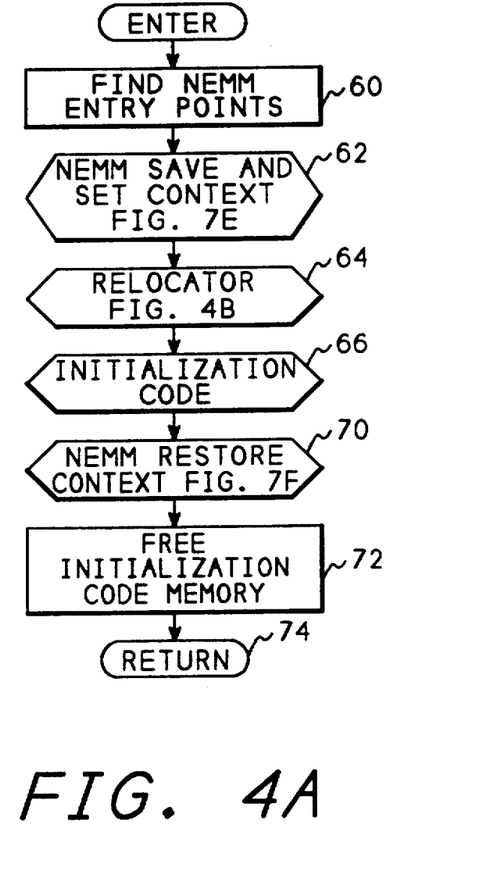
FIG. 4A is a flowchart of the skeleton part of the initialization section.

After loading a program module as shown in FIG. 3, DOS transfers control to a routine in the initialization segment called the skeleton. Referring now to FIG. 4A, a flowchart of the skeleton is shown. Block 60 finds the entry point to NEMM. NEMM must have been loaded earlier, and typically is written as a DOS device driver, so the NEMM entry point is located by opening a file to the NEMM device. A data area is then passed to NEMM in an IOCTL (Input/Output Control) operation, and NEMM uses this data area to return its entry point address. Block 62 calls NEMM to save the existing context of the page frame, and set the transient segment context into the page frame, then block 64 transfers to FIG. 4B to relocate the transient segment to expanded memory. Block 66 then calls the initialization segment to start the program module. During its initialization, the program module must set up any hardware interrupt vectors it may use and otherwise make itself available to the user code that will call it later. After returning from initialization, block 70 calls NEMM to restore the page frame context, and block 72 frees the memory allocated to the initialization segment and the relocator. Then block 74 returns control to DOS. Since hardware interrupt vectors were established by the initialization segment, the resident segment and transient segments remain in their respective memories to perform future services for the user code.

Figure 4B:
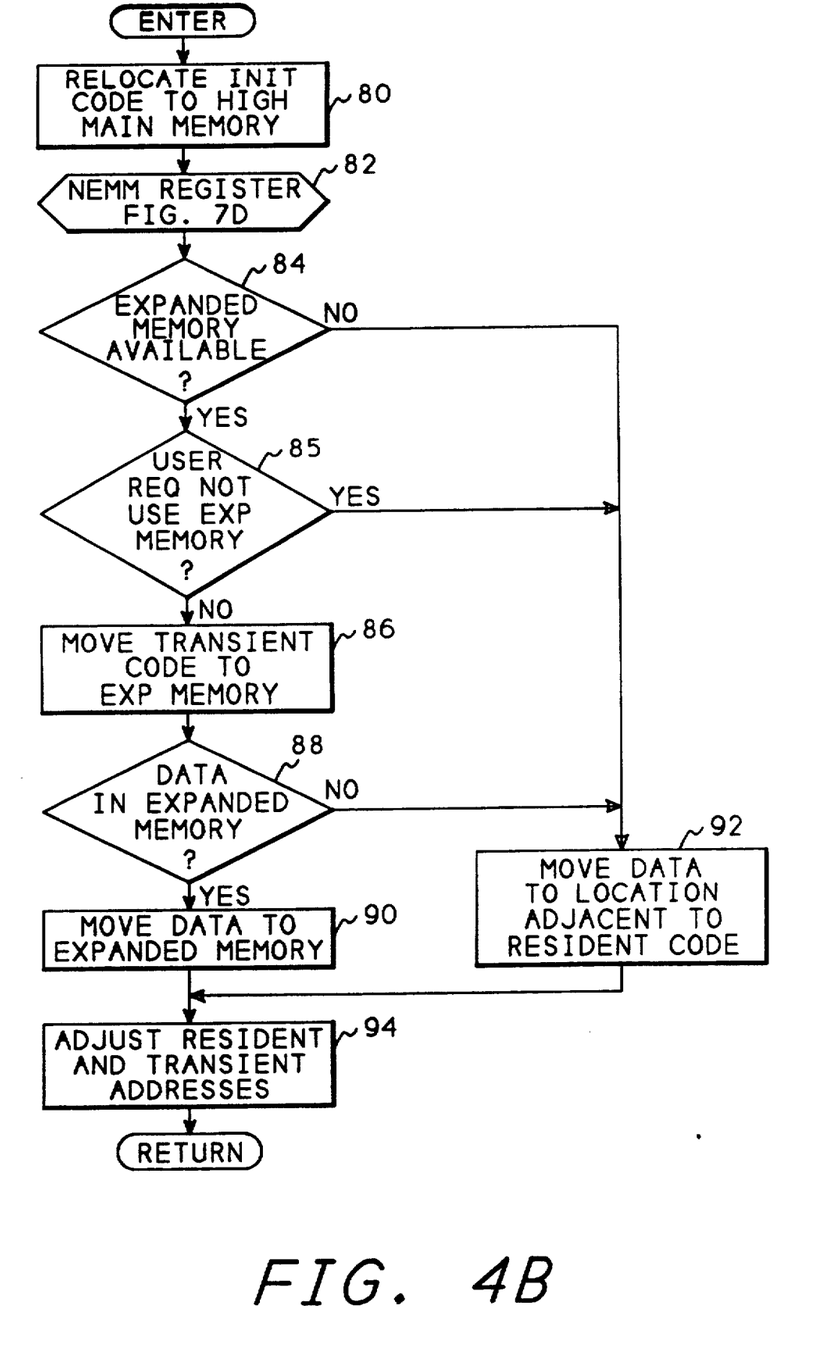
FIG. 4B is a flowchart of the relocator part of the initialization section.

FIG. 4B is a flowchart of the code that relocates the transient and data segments into expanded memory. After entry, block 80 relocates the initialization segment and the relocator code to a high memory address within the 640K main memory. This relocation facilitates the removal of the initialization and the relocation code by the skeleton before the skeleton returns to DOS. Block 82 then calls the register function in NEMM to determine if expanded memory is available on the computer. If expanded memory is available, block 84 transfers to block 85 to determine if the user has requested that expanded memory not be used. If expanded memory is available and the user has not prevented its use, control transfers to block 86 where the transient segment is moved to expanded memory. The addresses placed in the resident segment do not reference the pages where the transient segment is located in expanded memory, instead, these addresses reference the page frame addresses where the transient segment will be located after NEMM has switched the transient segment into the page frame. Block 88 then determines if the data segment is to be moved to expanded memory, and if it is, block 90 moves the data. If any of blocks 84, 85, or 88 determine that expanded memory is not to be used, control transfers to block 92 where the data segment is moved to an area just above the transient segment, overlaying the area originally occupied by the initialization segment. This compresses the program module to its smallest possible state so that it uses only the minimum main memory necessary. After the data segment has been moved, block 94 adjusts addresses in the resident and transient segments to reflect the new addresses of the transient and data segments. Control then returns to the skeleton.

Figure 5A:
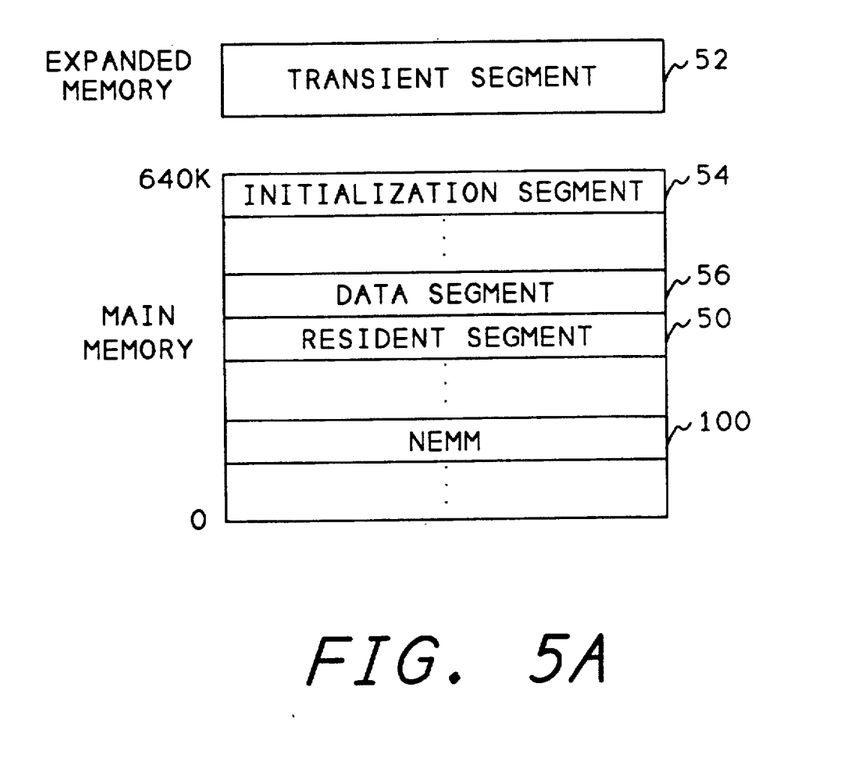
FIG. 5A shows the organization of the sections of code after relocation into expanded memory with data remaining in main memory.

FIG. 5A shows the location of the segments after relocation in a computer having expanded memory, where the user requested that data remain in main memory. Since NEMM 100 was loaded before the program module, it resides somewhere in memory below the program module. Resident segment 50 remains in main memory where it was loaded by DOS. Data segment 56 has been moved to a main memory address just above the resident segment 50, and the initialization segment 54 has been moved to high main memory addresses to facilitate its removal from memory. The transient segment 52 has been moved to pages in expanded memory. Because it must be available to the resident segment at all times during execution of the program module, the transient segment may not be larger than the 64K page frame.

Figure 5B:
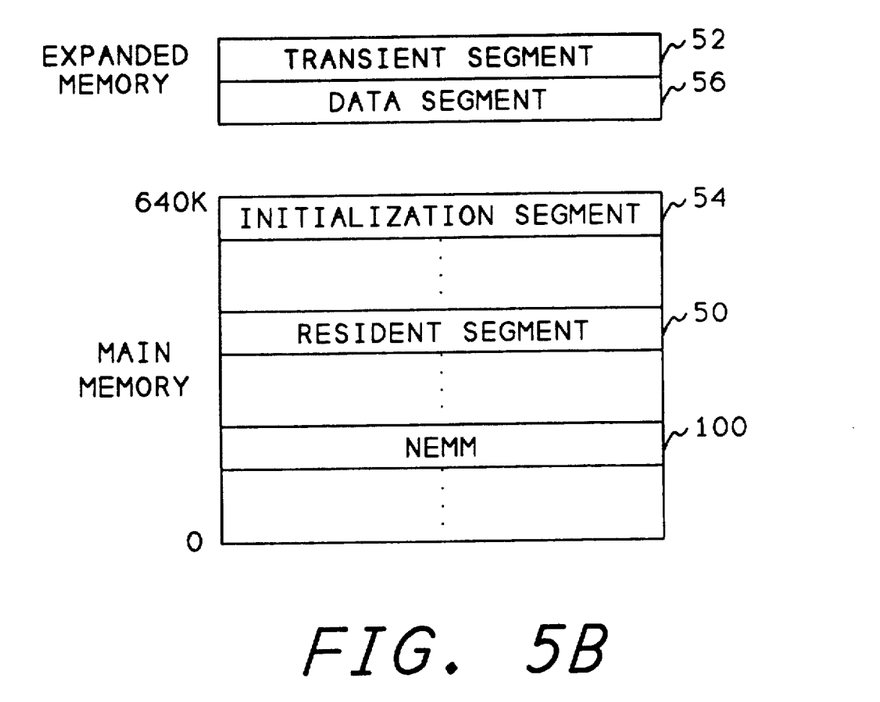
FIG. 5B shows the organization of the sections of code after relocation into expanded memory with data being relocated into expanded memory.

FIG. 5B shows the location of the segments after relocation in a computer having expanded memory, where the user requested that data be relocated to expanded memory. Since NEMM 100 was loaded before the program module, it resides somewhere in memory below the program module. Resident segment 50 remains in main memory where it was loaded by DOS. Data segment 56 has been moved to expanded memory along with transient segment 52. The initialization segment 54 has been moved to high main memory addresses to facilitate its removal from memory. In this configuration, the size of the transient segment plus the size of the data segment must be smaller than the page frame, since both must be available at the same time.

Figure 5C:
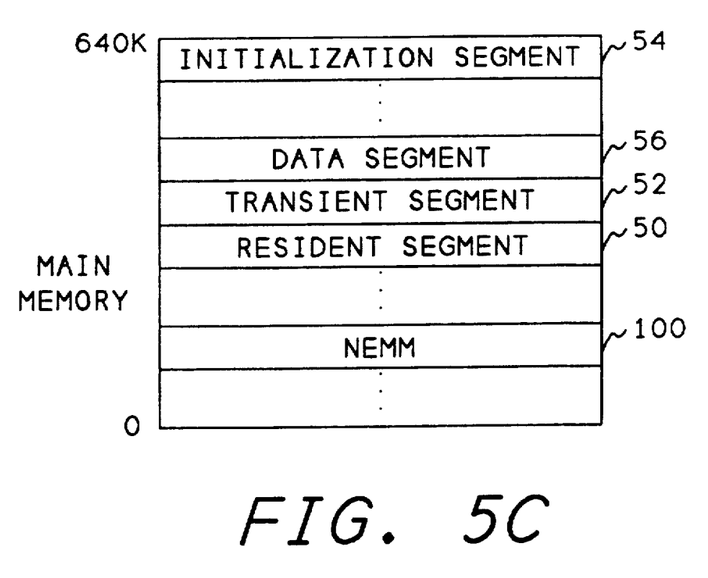
FIG. 5C shows the organization of the sections of code with no expanded memory present.

FIG. 5C shows the location of the segments after relocation in a computer that does not have expanded memory, or where the user has requested that expanded memory not be used. Resident segment 50 and transient segment 52 remain in main memory where they were originally loaded by DOS, however the initialization segment 54 has been moved to high memory, and the data segment has been relocated to just above the transient segment.

Figure 6:
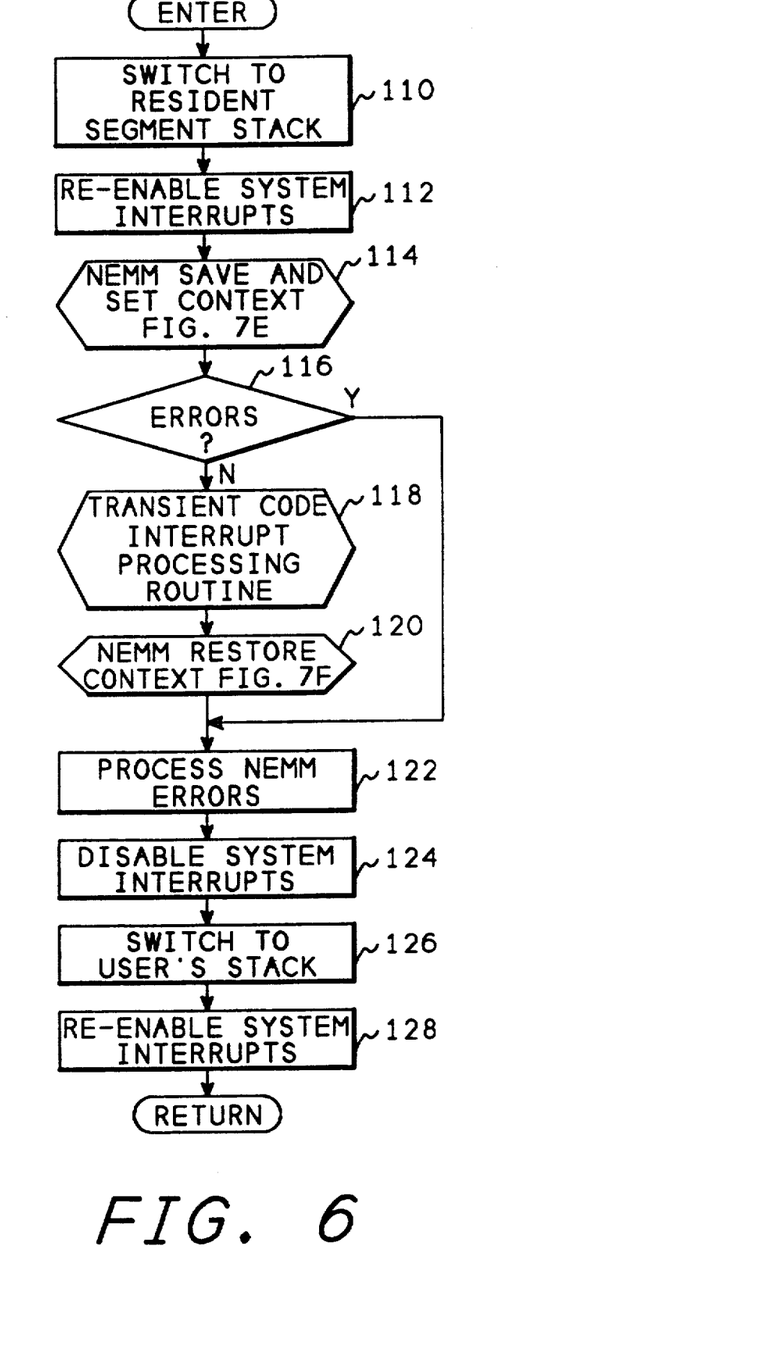
FIG. 6 is a flowchart of the execution of the sections of code of the present invention.

FIG. 6 is a flowchart of the resident segment of a program module of the present invention. Entry to the resident segment may be either through a call from a user program, typically through an I/O function where the resident segment is installed as a device driver, or via a hardware interrupt vector. The flowchart of FIG. 6 depicts a resident segment that is entered via a hardware interrupt vector. For a resident segment that is entered via an I/O call, system interrupts would need to be disabled upon entry, whereas with entry via a hardware interrupt vector, the hardware interrupt has already disabled interrupts.

Referring now to FIG. 6, upon entry, block 110 switches the stack to a stack in the resident segment of code in order to ensure that the user's stack does not overflow. Block 112 then re-enables system interrupts so that other interrupt routines can function while the program module is performing its function. Block 114 then calls the NEMM save and set context function to save the page frame context of whoever is using the extended memory, and switch in the transient segment pages so that they can be called. Block 116 checks for errors and if errors occurred, the transient call is bypassed. If no errors were found, block 118 calls the transient segment procedure to handle this type of hardware interrupt.

It is important to note that while this flowchart shows all the interrupt handling process being performed in the transient segment, the resident segment could perform some of the processing and call the transient segment for the rest of the processing, or only call the transient segment for some types of processing. That is, there are other variations on resident segment processing that would not always call the transient segment.

Upon return from the transient segment, block 120 calls the NEMM restore context function to return the page frame to its original state. Block 122 then processes any errors encountered in either NEMM call. Block 124 disables system interrupts so that block 126 can switch the stack back to the user's stack. Block 128 re-enables interrupts before returning to the caller.

This process functions very well for multiple program modules. For example a network server might have four program modules installed in the system, one to process network output requests and place the requests in an output queue, one to process network output hardware interrupts to remove an output request from the output queue and send it over the network, one to process network input hardware interrupts to receive messages and place them in an input queue, and a fourth process to remove messages from the input queue and deliver them to a user program. All four modules would use the same versions of the NEMM code thus saving a substantial amount of main memory.

FIGS. 7A through 7F depict the various functions of the NEMM. The usage of these functions has been discussed in earlier flowcharts where the functions were called to perform services for the other program modules.

Figure 7A:
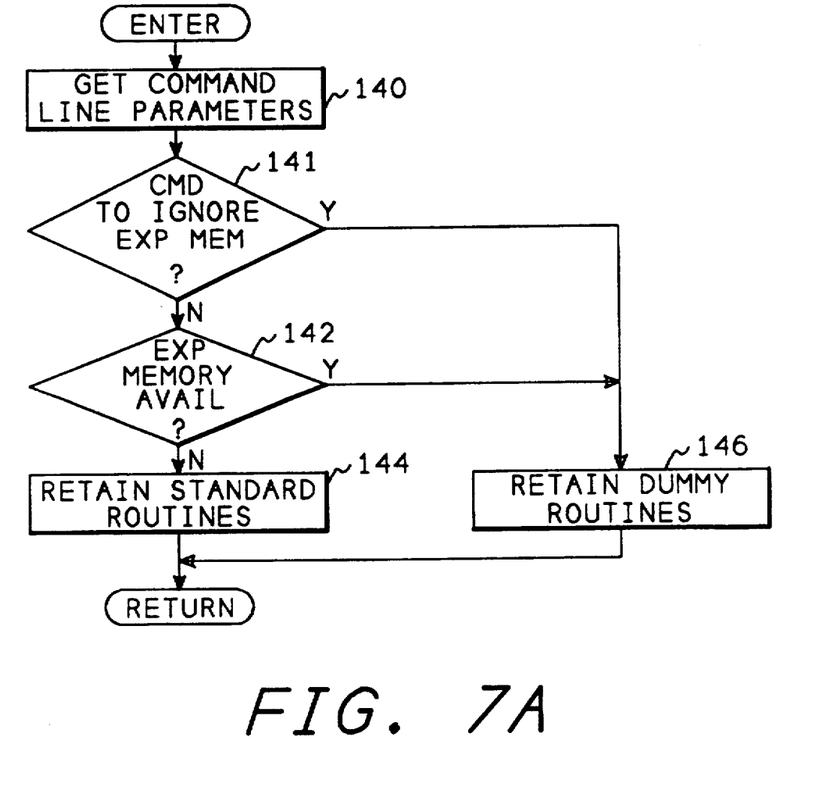
FIG. 7A is a flowchart of the load section of the NEMM resident sections.

NEMM must be the first program module loaded in the system, since its functions will be used by all the other program modules. FIG. 7A depicts the process whereby NEMM is loaded into the system. After DOS brings the NEMM module into memory, block 140 reads the command line used in the load process to obtain any parameter passed by the user. If the command line does not contain a parameter instructing NEMM to not use expanded memory, block 141 transfers control to block 142 where NEMM determines if expanded memory is available. If expanded memory is available, block 144 retains the NEMM standard processing routines for expanded memory. If block 141 found a parameter instructing NEMM not to use expanded memory, or if block 142 found that the computer did not have expanded memory installed, control transfers to block 146 where dummy routines are retained instead of the standard routines. The routines that are not retained will be discarded when NEMM returns to DOS. In this manner, NEMM will function the same whether expanded memory is being used or not. In other words, the program modules that use NEMM services will call the same routines without regard to whether or not expanded memory is present, and if expanded memory is present and being used, NEMM will perform the correct functions on the page frame. If expanded memory is not present or it is not being used, NEMM will execute a dummy routine that does nothing. After retaining the selected routine control returns to DOS to wait for use of the NEMM services.

Figure 7B:
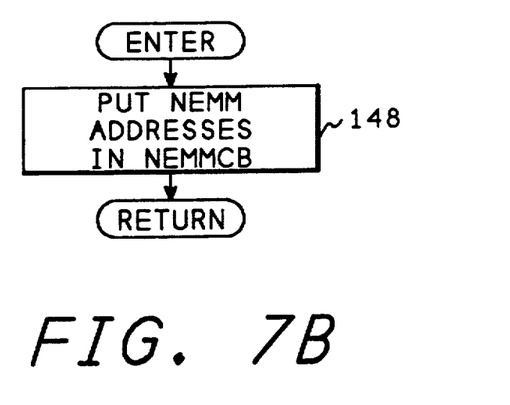
FIG. 7B is a flowchart of the IOCTL section of the NEMM resident sections.
Figure 7C:
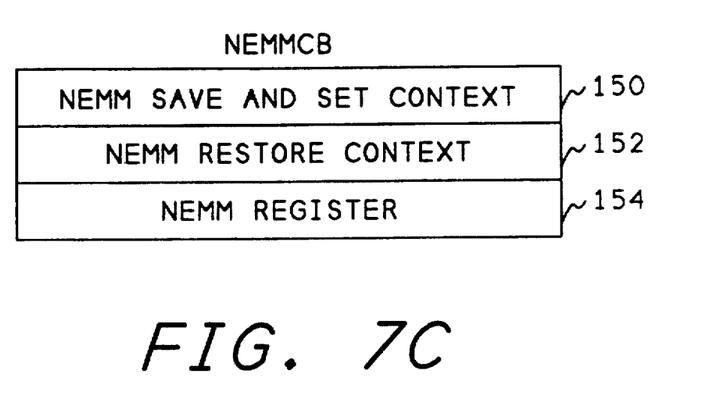
FIG. 7C is a diagram of the NEMMCB data area used by the NEMM sections of the present invention.

Since the NEMM is loaded as a device driver in DOS, its location is not known to the other modules that need to use its services. FIG. 7A is a flowchart of the NEMM IOCTL function that returns the entry addresses of the NEMM functions to the other modules, so they can use NEMM services by executing a simple call instruction. Since NEMM is a device driver, it can be accessed through the I/O subsystem of DOS by opening a file having a device name that matches the NEMM. This is a very slow process in DOS and would seriously hinder the performance of the other program modules if every access to the NEMM functions were through the DOS open process. Therefore, the NEMM returns entry address for its various functions when it is opened and passed a control block for storing those addresses. Referring now to FIG. 7B, block 148 is entered after a file is opened having a device name that matches NEMM and an IOCTL operation is performed. When block 148 is entered it is passed the address of a NEMMCB control block, as depicted in FIG. 7C. Block 148 stores the addresses of the NEMM save and set context function in the first area 150, the NEMM restore context function in the second area 152, and the NEMM register function entry address into the third area 154 of the NEMMCB. After storing these addresses, control returns to the caller.

Figure 7D:
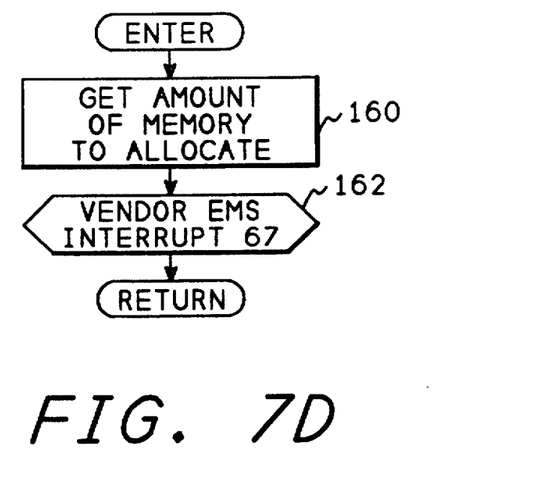
FIG. 7D is a flowchart of the register section of the NEMM resident sections.

The NEMM register function is used by the relocator (FIG. 4B) to allocate expanded memory for the transient segment of a program module. Referring now to FIG. 7D, a flowchart of the register function is shown. Upon entry, block 160 gets the amount of memory requested from the parameters passed in the call. Block 162 then calls expanded memory (EMS) software supplied by the vendor of the expanded memory to allocate the required pages of expanded memory. The EMS software may be different for each vendor of expanded memory, so a common entry exists through interrupt 67. In this way, NEMM is independent of a particular hardware vendor. Once the memory requested is allocated by the EMS software, control returns to NEMM, which, in turn, returns to its caller. Note that if expanded memory is not present or not being used, the NEMM register function is a dummy routine that does nothing.

Figure 7E:
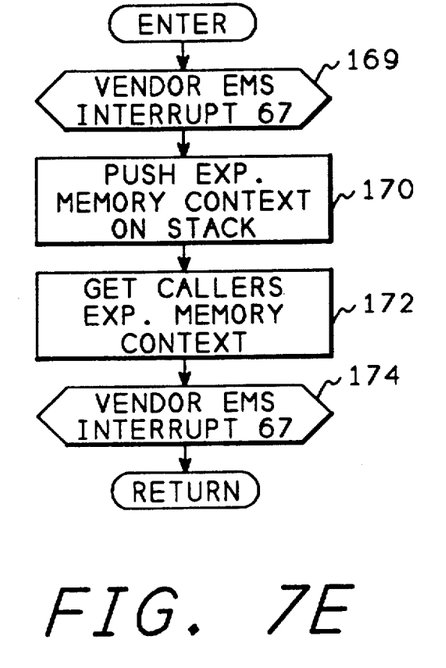
FIG. 7E is a flowchart of the save and set context section of the NEMM resident sections.

FIG. 7E depicts the NEMM save and set context function, which saves the page frame context on request, then switches the caller's pages into the page frame. Referring now to FIG. 7E, upon entry, block 169 calls the vendor supplied EMS software to get the context and block 170 pushes this context onto a stack maintained by NEMM. This saves the page frame context so that it can be restored later. Block 172 then gets the caller's context that was saved by the register function. Block 174 calls the vendor supplied EMS software through interrupt 67 to place the caller's context into the page frame. Since the context has been switched from the original user of the expanded memory to the calling modules context, control returns to the caller. Note that if expanded memory is not present or not being used, this function is replaced by a dummy function that does nothing.

Figure 7F:
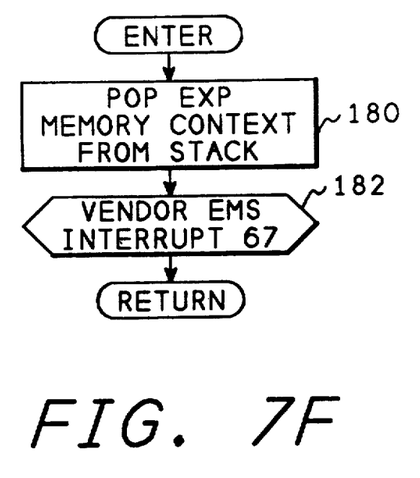
FIG. 7F is a flowchart of the restore context section of the NEMM resident sections.

FIG. 7F depicts the NEMM restore context function that is used by a program module after it has completed processing by a transient segment. Referring now to FIG. 7F, upon entry, block 180 pops the expanded memory context from the stack where it had been saved by the NEMM save and set context function. Block 182 then calls the vendor supplied EMS software through interrupt 67 to place this context into the page frame of the expanded memory. Control then returns to the caller. Note that if expanded memory is not present or not being used, this function is replaced by a dummy function that does nothing.

Figure 8:
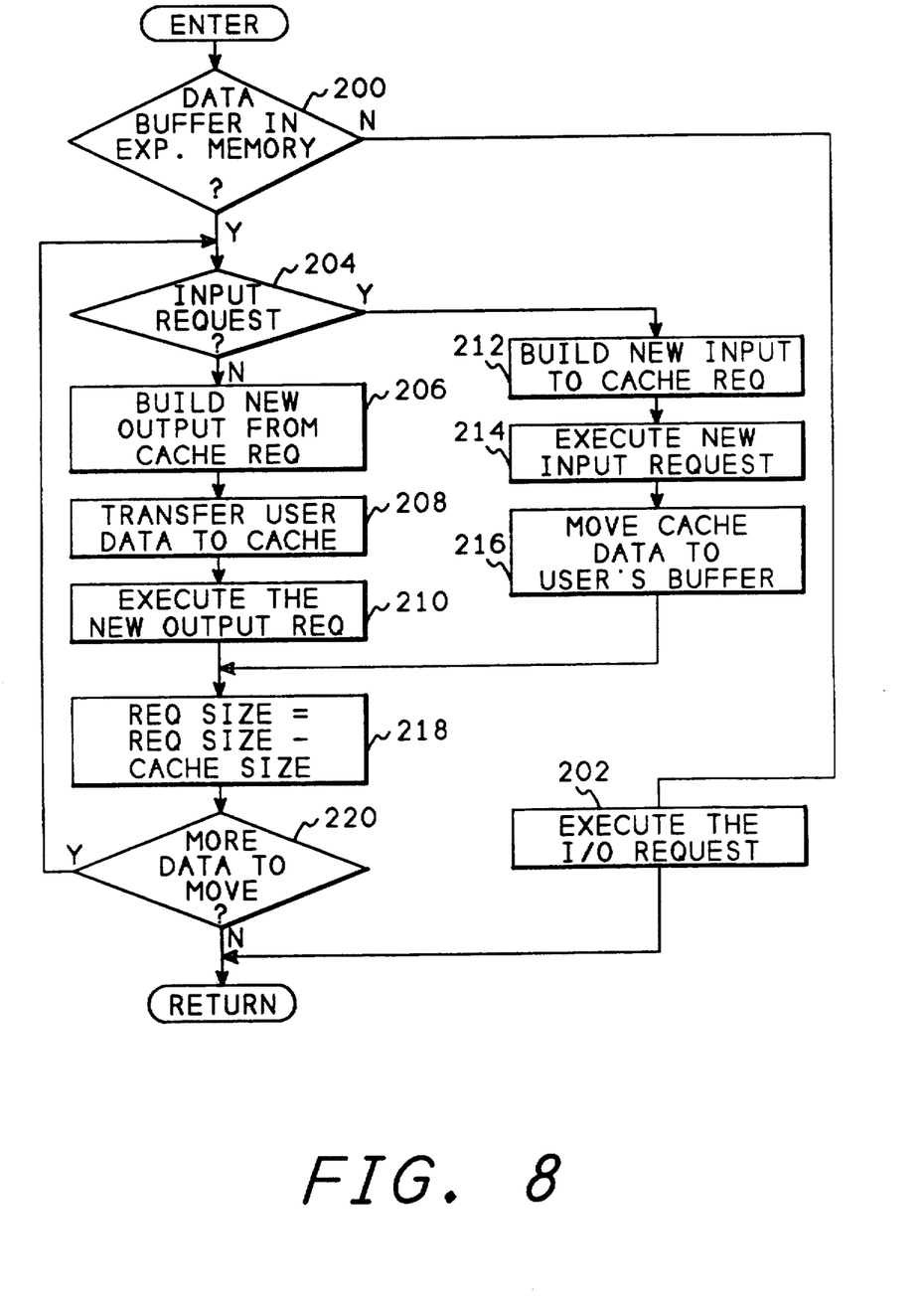
FIG. 8 is a flowchart of the module that intercepts I/O requests having a buffer located in expanded memory.

FIG. 8 depicts a flowchart of the module that is loaded in DOS to intercept I/O requests having a data address in expanded memory. The module of FIG. 8 is linked into the DOS I/O chain so that it receives control each time any I/O request is made, allowing it to examine all I/O requests and redirect their data buffer addresses when such addresses reference expanded memory.

Referring now to FIG. 8, block 200 receives control when any DOS I/O request is made. It examines the data buffer address for the request, and if that address is not in expanded memory, it transfers to block 20 to which jumps to the original DOS I/O chain to perform the original request. If the data buffer is located in expanded memory, control goes to block 204 to determine the size of the data buffer. This module solves the expanded memory - I/O buffer problem by providing its own cache buffer in main memory to temporarily hold the user data. Block 204 determines if the I/O request is for input or output. If the request is for output, block 206 builds a new output I/O request for as much data as the cache will hold, and block 208 transfers the data from the user's buffer in expanded memory to the cache before block 210 executes the new request to output the data. If the request is for input, block 212 builds a new input I/O request for as much data as the cache will hold. Block 214 executes the input request to put the data into the cache, and block 216 transfers the data from the cache to the user's buffer in expanded memory. In either case, control goes to block 218 where the length of the request is decremented by the length of the cache. Block 220 determines if all data has been transferred, and goes to block 204 if not. If all the data has been transferred, control returns to the user. In this manner, this module prevents any I/O request from actually requiring expanded memory, so no conflict exists between the user data buffer and the transient segment.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A method of loading and executing a device driver program module, said device driver program module containing resident and transient sections, in a computer, said computer having a processing element for performing all steps of said method, a main memory, and optionally having an expanded memory containing switchable pages, said expanded memory also having a page frame for holding one or more of said switchable pages, said method comprising the steps of:
   (B) loading said device driver program module into said main memory;
   (C) if said expanded memory is not present proceeding with step (G);
   (D) moving said transient section to one or more pages of said expanded memory;
   (E) modifying addresses in said resident section that address locations in said transient section to address corresponding transient section locations in said expanded memory page frame area;
   (F) modifying addresses in said transient section that address locations in said resident section; and
   (G) accepting one or more calls from a second program module to said program module wherein processing each said one or more calls comprises the steps of
      (G1) receiving said call in said resident section,
      (G2) if said expanded memory is not present, proceeding with step (G5);
      (G3) saving all page frame information relating to a first set of pages currently contained in said page frame of said expanded memory,
      (G4) switching in one or more pages of said transient section into said page frame,
      (G5) calling said transient section of said device driver program module to process said call,
      (G6) if said expanded memory is not present, proceeding with step (G8),
      (G7) restoring said page frame information relating to said first set of pages of said expanded memory, and
      (G8) returning to said second program module.

2. The method of claim 1 wherein said program module further contains an initialization section, and step (F) further comprises the steps of:
   (F1) executing said initialization section of said program module; and
   (F2) releasing memory occupied by said initialization section.

3. The method of claim 1 wherein steps (G2), (G3), (G4), (G6) and (G7) are performed by a separately loaded program module.

4. The method of claim 1 wherein said program module further contains a data section, and wherein step (C) further comprises the step of moving said data section to one or more pages of said expanded memory, and wherein step (F) further comprises the step of modifying addresses in said resident section and said transient section that address locations in said data section to address corresponding data section locations in said expanded memory page frame.

* * * * *